United States Patent [19]
Barnes et al.

[11] Patent Number: 5,859,178

[45] Date of Patent: Jan. 12, 1999

[54] POLYMERIZATION OF CAPROLACTAM WITH CERTAIN QUATERNARY AMMONIUM COMPOUNDS

[75] Inventors: Arthur G. Barnes, Ridgefield, Conn.; Kathy L. Gottlund, Kutztown, Pa.

[73] Assignee: Puritek, Inc, Short Hills, N.J.

[21] Appl. No.: 918,099

[22] Filed: Aug. 22, 1997

Related U.S. Application Data

[60] Provisional application No. 60/024,403, Aug. 22, 1996.

[51] Int. Cl.⁶ ................................................. C08G 69/24
[52] U.S. Cl. ...................... 528/313; 528/310; 528/315; 528/319; 528/326
[58] Field of Search .................................. 528/310, 313, 528/315, 319, 326

[56] References Cited

U.S. PATENT DOCUMENTS

| | | | |
|---|---|---|---|
| 3,875,121 | 4/1975 | Brassat et al. | 528/323 |
| 3,919,175 | 11/1975 | Kralicek et al. | 528/313 |
| 4,107,154 | 8/1978 | Bacskai | 528/313 |
| 4,145,519 | 3/1979 | Bacskai | 528/313 |
| 4,217,442 | 8/1980 | Barnes et al. | 528/313 |

FOREIGN PATENT DOCUMENTS 1326546  8/1963  France.

OTHER PUBLICATIONS

Journal of Polymer Science Part C, No. 4 pp. 1097–1103, C: Mermoud "Nouvelle Classe de Cocatalyseurs dans la Polymerisation An ioni que due Carolacxame", The date of publication is not available.

*Primary Examiner*—P. Hampton-Hightower
*Attorney, Agent, or Firm*—Watson Cole Grindle Watson, P.L.L.C.

[57] ABSTRACT

A process for the polymerization of caprolactam to nylon-6 polymer, comprising the use of a polymerization accelerator having the structural formula

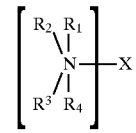

wherein $R^1$, $R_2$, $R_3$ and $R_4$ are alkyl, aryl and aralkyl radicals and mixtures thereof, and X is a halogen ion other than iodide and the temperature of said polymerization process is carried out at between about room temperature and about 115° C.

8 Claims, No Drawings

POLYMERIZATION OF CAPROLACTAM WITH CERTAIN QUATERNARY AMMONIUM COMPOUNDS

This application in claims provisional 60/024,403, filed Aug. 22, 1996.

BACKGROUND OF THE INVENTION

The invention relates generally to the polymerization of a caprolactam to form a polymer generally recognized by the designation, nylon-6. More specifically, it relates to a method of polymerizing a caprolactam with the use of certain quaternary ammonium compounds that act as accelerators.

Quaternary ammonium compounds have been utilized in the anionic polymerization of 2-pyrrolidone to form nylon-4, a related but different polymer from nylon-6. Thus, in U.S. Pat. No. 4,217,442, which issued on Aug. 12, 1980, there is a disclosure of the use of certain quaternary ammonium sulfates and bisulfates as polymerization accelerators for 2-pyrrolidone employing alkali metal pyrrolidonates as primary catalysts, together with $CO_2$, $SO_2$ or $MoO_3$ as activators. According to that patent, certain quaternary ammonium compounds were found to be effective as accelerators, e.g., tetrabutyl ammonium hydrogen sulfate, tetrabutyl ammonium bisulfate, and methyl tri-N-propyl ammonium sulfate, as well as methyl tri-N-butyl ammonium sulfate were all used as quaternary ammonium salts. In general, quaternary ammonium salts composed of radicals selected from the group consisting of tetrapropyl, tetrabutyl, tetraamyl, methyltripropyl, methyltributyl, methyltriamyl, ethyltripropyl, ethyltributyl, ethyltriamyl, and benzyltributyl sulfates, hydrogen sulfates, and ammonium hydrogen sulfates were all found to be effective accelerators. In addition, the polymerization of 2-pyrrolidone was carried out with a polymerization activator, which term is used synonymously with "initiator," selected from the group consisting of $CO_2$, $SO_2$ and $MoO_3$, with $SO_2$ being a preferred polymerization activator, and quaternary ammonium halides were also disclosed but not claimed, such use apparently being limited to functioning as a color suppressor when $SO_2$ is present as an activator.

Much less work has been carried out in an effort to enhance and accelerate the polymerization of caprolactams to a polymer that is commercially known as nylon-6. It is generally known that the polymerization of caprolactams is affected by temperature and the catalyst employed. It is indicated by the prior art that polymerization occurs where the sodium salt of caprolactam and carbon dioxide are reacted at a temperature above 110° C. Indeed, between 140° C. and 160° C. there is a sudden increase in the temperature of the reaction, and at about 160° C. the polymer precipitates in the form of granules.

Utilizing a reaction temperature approaching 160° C. is a temperature that is so high that it may give rise to problems in the practicality of controlling the polymerization. Thus, it is apparent that it would be highly desirable to have the polymerization of caprolactam proceed to the greatest extent possible at far lower temperatures. Indeed, to achieve such polymerization at a temperature below 100° C. is a realistic goal, which the inventors of the present invention have accomplished by the process disclosed herein. Further, since the polymerization process is normally carried out as a batch-type process, it is also highly desirable that the process proceed as rapidly as possible, for example, over a period of less than four hours, since during batch processing a single piece of equipment will be occupied for the entirety of the polymerization procedure and, unless there is costly duplication of equipment, polymerization of a single batch will occupy a piece of equipment until the batch polymerization has been completed.

As a consequence, it is a primary object of the present invention to provide a process for the polymerization of caprolactam to nylon-6, which process may be carried out at the lowest practical temperature in the shortest amount of time, and achieve as complete polymerization of the caprolactam as possible.

SUMMARY OF THE INVENTION

The present invention is based on the discovery that a substantial decrease in the temperature at which caprolactam polymerization may be carried out, and an increased degree of polymerization over a specific period of time, are achieved when caprolactam is polymerized in the presence of certain quaternary ammonium compounds, in addition to a conventional catalyst and an activator. While such accelerants are in the form of quaternary ammonium compounds, they are not, in general, the same quaternary ammonium compounds that were found to be most advantageously useful in accelerating the polymerization of 2-pyrrolidone to polypyrrolidone, or nylon-4. Instead, the accelerants of the present invention are different from those that were found most useful in accelerating the polymerization of pyrrolidone. Why these different quaternary ammonium compounds are more effective in enhancing the polymerization of caprolactam is not fully recognized at the present time. However, the fact that certain quaternary ammonium compounds are more effective has now been discovered and constitutes an important part of the present invention.

Moreover, in the prior art it has been found highly desirable to maintain a high but narrow molecular weight range of the finished nylon-6 polymer so that there will be uniformity in melt processing of the polymer. Thus there has been a conflict between the rate of polymerization and the achievement of a narrow molecular weight range in the polymer. With higher concentrations of initiator or activator, for example, and especially with n-acetyl caprolactam used as an initiator, faster rates of polymerization at high temperatures to high conversion rates are achieved. However, with such higher ranges and increased rates of polymerization comes the production of a polymer that has a molecular weight average that is obtained only by averaging molecular weights over a wide range, which is undesirable. Another important advantage of the present invention is that we are able to achieve relatively high rates of polymerization at low temperatures, which also may result in a narrow range of molecular weights of the resulting polymer, nylon-6.

According to our invention, we have achieved accelerated rates of polymerization of caprolactam by adding certain quaternary ammonium compounds as accelerators. The temperature ranges achieved have been quite low, e.g., 80° to 100° C. versus an otherwise preferred range of about 130° to 200° C. of the prior art. Such quaternary compounds are used in addition to a known activator, n-acetyl caprolactam, or other known activators, e.g., carbon dioxide. Thus, by use of certain quaternary ammonium compounds, we have found that the polymerization reaction can be carried out at an accelerated rate, at lower temperatures, and with an indicated yield of polymer of a molecular weight which, measured as an average, will have less divergence from the average or mean than that produced by the prior art.

Those quaternary ammonium compounds which have thus far been deemed to constitute accelerators that will enable caprolactam to be polymerized in accordance with the present invention are those represented by the structural formula

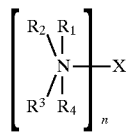

wherein $R_1$, $R_2$, $R_3$ and $R_4$ are alkyl, aryl and aralkyl radicals, including mixtures thereof, n is 1, and X is a halogen ion other than iodide. Within this broad range, we have found the following quaternary ammonium compounds to be effective as accelerators: methyl tributyl ammonium chloride, and, we believe, mthyl triethyl ammonium chloride and tetramethyl ammonium chloride. However, we have reason to believe from extensive experimentation that other quaternary ammonium compounds, and specifically those within the generic formula set forth above, are also operative. Unexpectedly, we have found that bisulfates and hydrogen sulfates, which have been used in the prior art as accelerators for the polymerization of pyrrolidones, are not effective and do not fall within the scope of the present invention. Further, we have also determined that rather than use $SO_2$ or $MoO_3$, as has been done in the prior art with respect to pyrrolidones, $CO_2$ is the preferred initiator here.

In furtherance of this detailed description of our invention, the following examples will illustrate the nature of our invention.

EXAMPLE 1

On a volume basis, a stock solution was prepared by dissolving 10 ml of a 10 mole percent mix of the potassium salt of caprolactam in 20 ml of N-methyl pyrrolidone, used as a solvent. This stock solution was liquid at room temperature. It was maintained in a sealed flask.

EXAMPLE 2

One ml of stock solution was added to one ml of caprolactam and blended in a vortex blender. Then 20 microliters of n-acetyl caprolactam was added and again the mixture was blended in a vortex blender. Then the solution was placed in an oven at 80° C. for one hour. This was used as a control to determine the acceleration or lack thereof of specific quaternary ammonium compounds. When the mix was removed from the oven, solid polymer had been formed. The yield was determined to be 18.0%, measured by dividing the weight of washed, dried polymer by the weight of all starting materials.

EXAMPLE 3

The process of Example 2 was repeated, but using 80 microliters of n-acetyl caprolactam. The yield was somewhat higher, 53.2%.

EXAMPLE 4

The process of Example 2 was repeated, using 20 microliters of n-acetyl caprolactam and, in place of the caprolactam, 1 ml of tetramethyl ammonium chloride. A solid precipitate formed within ten minutes. The percentage yield after one hour was calculated at 22.9%.

EXAMPLE 5

The process of Example 1 was repeated, but using tetramethyl ammonium chloride in place of the caprolactam used as a control. When 40 microliters of n-acetyl caprolactam was used, a solid precipitated within ten minutes. After one hour at 80° C. the yield was 45.1%.

EXAMPLE 6

The process of Example 4 was carried out, using 80 microliters of n-acetyl caprolactam. Again, within ten minutes a solid 20 precipitate was observed. After one hour at 80° C. the yield was 58.3%.

EXAMPLE 7

In order to contrast the difference between the use of tetramethyl ammonium chloride and methyl tributyl ammonium chloride, each was tested using 1 ml of the potassium salt of caprolactam and 20 microliters of n-acetyl caprolactam. With the tetramethyl ammonium chloride the yield after one hour at 80° C. was 22.9%; the yield using methyl tributyl ammonium chloride as the accelerator was 34.9%. As a consequence, it was determined that while both of these quaternary compounds are effective as accelerators, the methyl tributyl ammonium chloride was the more effective, at least using that quantity of n-acetyl caprolactam.

EXAMPLE 8

Experiments were performed to contrast the use of the two above-named quaternary ammonium compounds against other quaternary ammonium compounds that were not halides, but were sulfates or bisulfates. Thus, the procedure of Example 7 was carried out using tetrabutyl ammonium hydrogen sulfate with 80 microliters of NAC, and repeated using 40 microliters of NAC. In each case a clear, amber liquid resulted with no precipitate after 1 hour at 80° C.

EXAMPLE 9

The procedures of Example 6 were repeated using methyl tributyl ammonium bisulfate as the accelerator, first with 80 microliters NAC, and then with 40 microliters NAC. In each case the result was a clear, amber liquid after 1 hour at 80° C. with no precipitate. It was thus concluded that the utilization of these bisulfates and hydrogen sulfates was markedly inferior to the use of quanternary ammonium chlorides as accelerators.

EXAMPLE 10

Contrasting the results from the use of caprolactam as a control, as in Example 2, with the use of a halide under the generic formula, there was a noticeable increase in yield when the generic halide was used in place of caprolactam. This marked increase in yield occurred over a range of quantities of n-acetyl caprolactam used as an activator i.e., when 20 μl, 40 μl and 80 μl of NAC were utilized. Indeed, the most significant difference when the quaternary ammonium halides are used was observed in the lowest concentration of n-acetyl caprolactam, i.e., 20 μl., where the control gave a yield of 18.0% and the methyl tributyl ammonium chloride yielded 34.9% polymer. At the same concentrations, the bisulfates and hydrogen sulfates resulted in no polymer formation. The tetramethyl ammonium chloride resulted in a yield less than that of the methyl tributyl ammonium chloride, but still significantly higher than the caprolactam control.

From these tests it was determined that polymerization also occurs at room temperatures, although the yields were less than those achieved at 80° C.

Further experimentation was conducted using SO₂ as an initiator. At the concentrations tested using the same stock solutions as described above, SO₂ did not initiate polymerization.

With regard to temperature ranges, as stated there was some polymerization, even at room temperature. Experiments were also conducted to determine percent yield at 80° C. compared with 115°° C. In general, the yields were lower at the higher temperature. This is significant because it is highly desirable to effect polymerization at as low a temperature as possible, and the prior art generally carries out polymerization at temperatures higher than 115° C. With regard to initiators, SO₂ failed as an initiator. Using carbon dioxide as an initiator, the stock solution was a cloudy white, which indicated that some polymer formation was possible so that CO₂ is an appropriate initiator.

With respect to the concentration of quaternary ammonium compound, experiments were also performed to determine whether the yield varied in accordance with the concentration of the ammonium chloride used. General results indicated that the lower the concentration of methyl tributyl ammonium chloride, the higher the yield of polymer. Again with regard to temperature, it was demonstrated that the quaternary ammonium halides are effective at lower temperatures and, indeed, may inhibit polymerization at temperatures of 115° C. and above.

As a consequence of our experimentation, we have concluded and have proved that the use of a structural formula in accordance with that set forth hereinbefore significantly enhances yield of polymer and decreases the time of polymerization at temperatures below 115° C. and, most propitiously, at temperatures of about 80° C. Further, the use of NAC as an initiator also increases yield. CO₂ can be used as an initiator, whereas SO₂ is not a good initiator for caprolactam. The potassium salt of caprolactam was used as primary catalyst and is the caprolactam to which reference is made, except where caprolactam, itself, as monomer, is specified. N-methyl pyrrolidone is used as the solvent of choice. The above is believed to constitute a significant contribution to the art of making nylon-6 by the polymerization of caprolactam.

We claim:

1. A process for the polymerization of caprolactam to a nylon-6 polymer, comprising the use of a polymerization accelerator having the structural formula

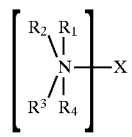

wherein R₁, R₂, R₃, and R₄ are alkyl, aryl and aralkyl radicals, and mixtures thereof, and X is a halogen ion other than iodide, and the temperature of said polymerization process is carried out at between about room temperature and about 115° C.

2. A process as claimed in claim 1, wherein said accelerator is tetramethyl ammonium chloride.

3. A process for the polymerization of caprolactam, comprising preparing a stock solution of the potassium salt of caprolactam in N-methyl pyrrolidone, adding an aliquot portion of said stock solution to a substantially similar quantity of caprolactam to form an initial mixture, blending said initial mixture, adding to said initial mixture a lesser amount of an accelerator selected from the group consisting of methyl tributyl ammonium chloride, tetramethyl ammonium chloride, and methyl triethyl ammonium chloride and mixtures thereof to form a secondary mixture, and maintaining said secondary mixture at a temperature between about room temperature and about 115° C. to form a solid polymer of nylon-6.

4. A process as claimed in claim 3, in which said secondary mixture is maintained between about 80° and 100° C.

5. A process as claimed in claim 3, in which said secondary mixture is maintained at a temperature of about 80° C.

6. A process as claimed in claim 3, in which said polymerization is carried out in the presence of CO₂ as an initiator.

7. A process as claimed in claim 3, in which n-acetyl caprolactam is utilized as an initiator.

8. A process for the polymerization of caprolactam to a nylon-6 polymer, comprising the use of a polymerization accelerator selected from the group consisting of methyl tributyl ammonium chloride and methyl triethyl ammonium chloride.

* * * * *